(12) United States Patent
White

(10) Patent No.: US 7,672,955 B2
(45) Date of Patent: Mar. 2, 2010

(54) METHOD AND SYSTEM FOR PLATFORM-INDEPENDENT FILE SYSTEM INTERACTION

(75) Inventor: Eric White, Austin, TX (US)

(73) Assignee: Vignette Software L.L.C., Austin, TX (US)

( * ) Notice: Subject to any disclaimer, the term of this patent is extended or adjusted under 35 U.S.C. 154(b) by 599 days.

(21) Appl. No.: 10/947,868

(22) Filed: Sep. 23, 2004

(65) Prior Publication Data

US 2005/0038802 A1 Feb. 17, 2005

Related U.S. Application Data

(63) Continuation of application No. 10/028,232, filed on Dec. 21, 2001, now Pat. No. 6,892,377.

(60) Provisional application No. 60/257,387, filed on Dec. 21, 2000.

(51) Int. Cl.
*G06F 7/00* (2006.01)

(52) U.S. Cl. .................. 707/100; 707/101; 709/217; 717/100; 717/116; 717/118

(58) Field of Classification Search .................. None
See application file for complete search history.

(56) References Cited

U.S. PATENT DOCUMENTS

| | | | |
|---|---|---|---|
| 4,754,428 A | 6/1988 | Schultz et al. |
| 4,811,207 A | 3/1989 | Hikita et al. |
| 5,202,982 A | 4/1993 | Gramlich et al. |
| 5,210,824 A | 5/1993 | Putz et al. |
| 5,212,787 A | 5/1993 | Baker et al. |
| 5,226,161 A | 7/1993 | Khoyi et al. |
| 5,257,369 A | 10/1993 | Skeen et al. |

(Continued)

OTHER PUBLICATIONS

H. Schrimpf, "Migration of Processes, Files, and Virtual Devices in the MDX Operating System". Operating Systems Review. vol. 29, pp. 70-81, Apr. 1995.

"DataSage Customer Analyst: Customer Intelligence from you POS Data", DataSage, Discount Store News, 11 pages, Apr. 6, 1998.

(Continued)

*Primary Examiner*—Don Wong
*Assistant Examiner*—Shyue Jiunn Hwa
(74) *Attorney, Agent, or Firm*—Sprinkle IP Law Group

(57) ABSTRACT

A method and system are disclosed for platform-independent file system interaction that can abstract the system-level idiosyncrasies associated with multi-platform, multi-language, multi-encoding file system interactions. One embodiment of the method of this invention can comprise instantiating a string object via a development environment coded calling process and setting a file name and a file path, having an easily-identifiable format, for the string object with the calling process. The string object can determine the encoding of the file name and the file path and the calling process can forward the string object and an associated file operation to an operating system level file system interface handler. The operating system level file system interface handler can call an operating system naming function to format the string object. The string object naming function can be compiled along with an encoding marker indicating the target operating system for the desired file operation. The file name and the file path can be transcoded, based on the encoding marker value, to the encoding of the target operating system. The transcoded file name and file path can be returned to the development environment (e.g., to a developer's application) by the string object naming function. The operating system level file system interface handler can then execute the file operation.

19 Claims, 2 Drawing Sheets

U.S. PATENT DOCUMENTS

| | | | |
|---|---|---|---|
| 5,312,787 A | 5/1994 | Uchida et al. | |
| 5,331,673 A | 7/1994 | Elko et al. | |
| 5,339,392 A | 8/1994 | Risberg et al. | |
| 5,421,015 A | 5/1995 | Khoyi et al. | |
| 5,473,772 A | 12/1995 | Halliwell et al. | |
| 5,483,468 A | 1/1996 | Chen et al. | |
| 5,504,879 A | 4/1996 | Eisenberg et al. | |
| 5,572,643 A | 11/1996 | Judson | |
| 5,640,562 A * | 6/1997 | Wold et al. | 713/2 |
| 5,659,676 A * | 8/1997 | Redpath | 715/210 |
| 5,684,955 A | 11/1997 | Meyer et al. | |
| 5,704,017 A | 12/1997 | Heckerman et al. | |
| 5,727,129 A | 3/1998 | Barrett et al. | |
| 5,732,218 A | 3/1998 | Bland et al. | |
| 5,740,430 A | 4/1998 | Rosenberg et al. | |
| 5,754,845 A * | 5/1998 | White | 707/10 |
| 5,761,416 A | 6/1998 | Mandal et al. | |
| 5,774,660 A | 6/1998 | Brendel et al. | |
| 5,790,426 A | 8/1998 | Robinson | |
| 5,790,790 A | 8/1998 | Smith et al. | |
| 5,796,952 A | 8/1998 | Davis et al. | |
| 5,870,559 A | 2/1999 | Leshem et al. | |
| 5,878,223 A | 3/1999 | Becker et al. | |
| 5,884,282 A | 3/1999 | Robinson | |
| 5,901,315 A * | 5/1999 | Edwards et al. | 717/124 |
| 5,918,014 A | 6/1999 | Robinson | |
| 5,958,008 A | 9/1999 | Pogrebisky et al. | |
| 5,966,702 A * | 10/1999 | Fresko et al. | 707/1 |
| 6,009,436 A * | 12/1999 | Motoyama et al. | 707/102 |
| 6,012,052 A | 1/2000 | Altschuler | |
| 6,014,638 A | 1/2000 | Burge et al. | |
| 6,041,311 A | 3/2000 | Chislenko et al. | |
| 6,049,777 A | 4/2000 | Sheena et al. | |
| 6,049,869 A * | 4/2000 | Pickhardt et al. | 712/300 |
| 6,067,565 A | 5/2000 | Horvitz | |
| 6,085,196 A | 7/2000 | Motoyama et al. | |
| 6,085,226 A | 7/2000 | Horvitz | |
| 6,092,049 A | 7/2000 | Chislenko et al. | |
| 6,094,662 A | 7/2000 | Hawes | |
| 6,112,279 A | 8/2000 | Wang | |
| 6,122,661 A | 9/2000 | Stedman et al. | |
| 6,128,655 A | 10/2000 | Fields et al. | |
| 6,128,665 A | 10/2000 | Iturralde | |
| 6,138,141 A | 10/2000 | DeSimone et al. | |
| 6,141,737 A | 10/2000 | Krantz et al. | |
| 6,151,624 A | 11/2000 | Teare et al. | |
| 6,185,586 B1 | 2/2001 | Judson | |
| 6,185,608 B1 | 2/2001 | Hon et al. | |
| 6,192,415 B1 | 2/2001 | Haverstock et al. | |
| 6,198,824 B1 | 3/2001 | Shambroom | |
| 6,205,492 B1 | 3/2001 | Shaw et al. | |
| 6,272,492 B1 | 8/2001 | Kay et al. | |
| 6,279,015 B1 * | 8/2001 | Fong et al. | 715/239 |
| 6,311,180 B1 | 10/2001 | Fogarty | |
| 6,389,427 B1 | 5/2002 | Faulkner | |
| 6,408,360 B1 | 6/2002 | Chamberlain et al. | |
| 6,424,991 B1 * | 7/2002 | Gish | 709/203 |
| 6,523,027 B1 * | 2/2003 | Underwood | 707/4 |
| 6,549,916 B1 | 4/2003 | Sedlar | |
| 6,571,246 B1 | 5/2003 | Anderson et al. | |
| 6,601,233 B1 | 7/2003 | Underwood | |
| 6,603,476 B1 * | 8/2003 | Paolini et al. | 345/427 |
| 6,609,130 B1 * | 8/2003 | Saulpaugh et al. | 707/102 |
| 6,611,844 B1 * | 8/2003 | Saulpaugh et al. | 707/103 R |
| 6,651,095 B2 | 11/2003 | Barlock et al. | |
| 6,651,217 B1 | 11/2003 | Kennedy et al. | |
| 6,665,842 B2 | 12/2003 | Nielsen | |
| 6,697,844 B1 | 2/2004 | Chan et al. | |
| 6,701,428 B1 | 3/2004 | Harvey, III et al. | |
| 6,742,180 B1 * | 5/2004 | Ritz | 717/174 |
| 6,754,621 B1 | 6/2004 | Cunningham et al. | |
| 6,754,694 B1 * | 6/2004 | Hiura et al. | 709/206 |
| 6,774,452 B1 | 8/2004 | Ramkumar et al. | |
| 6,826,592 B1 | 11/2004 | Philyaw et al. | |
| 6,850,941 B1 | 2/2005 | White et al. | |
| 6,880,158 B1 * | 4/2005 | Basso et al. | 719/321 |
| 6,884,282 B2 | 4/2005 | Stevens et al. | |
| 6,910,066 B1 | 6/2005 | Pohl | |
| 7,000,222 B1 * | 2/2006 | Curtis et al. | 717/118 |
| 2001/0032254 A1 | 10/2001 | Hawkins | |
| 2001/0034771 A1 | 10/2001 | Hutsch | |
| 2001/0054087 A1 | 12/2001 | Flom | |
| 2002/0065912 A1 | 5/2002 | Catchpole et al. | |
| 2002/0165877 A1 | 11/2002 | Malcolm et al. | |
| 2002/0178187 A1 | 11/2002 | Rasmussen et al. | |
| 2003/0140316 A1 | 7/2003 | Lakritz | |
| 2003/0217117 A1 | 11/2003 | Dan et al. | |
| 2004/0030697 A1 | 2/2004 | Cochran et al. | |
| 2005/0027709 A1 * | 2/2005 | White et al. | 707/10 |

OTHER PUBLICATIONS

Kitts, "An Evaluation of Customer Retention and Revenue Forecasting in the Retail Sector: Investigation into the effects of Seasonality, Spending an Method" by DataSage, Inc., 63 pages, Oct. 25, 1999.

Kitts, "RMS Revenue and Retention Forecasting Final Phase Model Specification" by DataSage, Inc., 16 pages, Jan. 31, 2000.

Montgomery, et al., "Estimating Price Elasticities with Theory-Based Priors," J. Marketing Research, vol. 36, pp. 413-423, Nov. 1999.

Simon, "Price Management," Elsevier Sci Pub, pp. 13-41, 1989.

Subrahmanyan and Shoemaker, "Developing Optimal Pricing and Inventory Policies for Retailers Who Face Uncertain Demand," J. Retailing, vol. 72, pp. 7-30, 1996.

Vilcassim and Chintagunta, "Investigating Retailer Product Category Pricing from Household Scanner Panel Data," J. Retailing, vol. 71, pp. 103-128, 1995.

Weinstein, "Tackling Technology," Progressive Grocer, 6 pages, 1999.

Wellman, "Down in the (Data) Mines," Supermarket Business, pp. 33-35, 1999.

RT News, "New Customer Management System Returns Lost Sales to Dick's," RT Magazine, 1 page, 1999.

DataSage, Inc., "DataSage Customer Analyst," Progressive Grocer, 2 pages, 1998.

Miller, M., "Applications Integration-Getting It Together," PC Magazine, pp. 111-112, 116-120, 136, 138, Feb. 8, 1994.

"PointCast 2.0 Eases Burden on Network", PC Week, 2 pages, Jun. 2, 1997.

Strom, David, "The Best of Push", 6 pages, Apr. 1997.

"When Shove Comes to Push", obtained from http://web5.infotrac.galegroup.com/itw/info.../purl-rcl_eaim_0_a19113966&dyn=6!ar_fml?sw_aep+ucsantacru 5 pages, Feb. 10, 1997.

thirdvoice.com—Home Page and Frequently Asked Questions (7 pages), www.thirdvoice.com/help.20/faq.htm, 2000.

Dasgupta, Partha, "Resource Location in Very Large Networks," IEEE, pp. 156-163, May 1994.

Vetter, Ronald, J., "Mosaic and the World-Wide Web," IEEE, pp. 49-57, Oct. 1994.

Obraczka et al., "Internet Resource Discovery Services," IEEE, p. 8-22, Sep. 1993.

Sharma et al., "Hypertext Based Distributed Object Management for Information Location and Retrieval," IEEE, pp. 102-107, 1993.

wysiwyg://101/http://msdn.microsof....brary/wcedoc/wcesecur/crypto_1.htm, pp. 1-2, 2001.

Turley, "Design Specification for Packaged Application Support in Assassin," pp. 2-6, 1999.

Turley, Functional Specification for Packaged Application Support in Assassin, pp. 2-6, 1999.

Decision on Appeal in U.S. Appl. No. 09/931,228, White, dated Oct. 21, 2008, 11 pages.

* cited by examiner

METHOD AND SYSTEM FOR PLATFORM-INDEPENDENT FILE SYSTEM INTERACTION

RELATED INFORMATION

This application is a continuation of, and claims a benefit of priority under 35 U.S.C. 120 of the filing date of U.S. patent application Ser. No. 10/028,232 by inventor Eric White entitled "Method and System for Platform-Independent File System Interaction" filed on Dec. 21, 2001, now U.S. Pat. No. 6,892,377 which in turn claims the benefit of priority under 35 U.S.C. § 119 to provisional patent application No. 60/257,387 filed Dec. 21, 2000, both of which are hereby expressly incorporated by reference herein for all purposes.

TECHNICAL FIELD OF THE INVENTION

This invention relates generally to the operation of client server computer networks. More particularly, the present invention relates to methods and systems for interfacing with an operating system file space. Even more particularly, the present invention relates to a method and system for platform-independent file system interaction that can provide a singular programmatic interface for developers to access and manipulate file specifications regardless of operating system encoding capabilities or the nature of an original specification encoding.

BACKGROUND OF THE INVENTION

When developing applications for computer system implementation, such as within a client-server computer network, developers must make system calls to the file system of an underlying operating system with which they are working. Such system calls to the operating system file structure may comprise calls to manipulate the operating system's directory structure or to open an individual file. These system calls must adhere to an operating system recognized specification, including the file path and the file name of the content that is being requested by the call. The underlying operating system's application program interfaces ("APIs") typically only handle pre-defined types of system calls and query strings. For example, standard operating system APIs can typically only process ASCII (American Standard Code for Information Interchange) encoded data as parameters to system calls.

The default encoding implementation in most system libraries is pure ASCII, and only recently have changes been made, for example, to the Microsoft Windows and standard Unix APIs to accept non-ASCII characters in a file specification. However, in the Windows environment, the use of non-ASCII characters in a file specification requires a separate API (a separate function call). Thus, to pass a non-ASCII file specification to a Windows system, a developer must make an additional and completely different function call than that used for ASCII characters.

Non-ASCII encoding specifications are often categorized under the heading of Unicode. Unicode methods are function calls within an operating system API that allow the API to accept Unicode character specifications, as opposed to ASCII character specifications. Operating systems process Unicode calls in a variety of different manners. For example, in Unix, the function calls for ASCII and Unicode character specifications are the same, and Unix can accept, for example, a UTF-8 encoded string rather than just an ASCII string. "UTF-8" stands for UCS Transformation Format, 8-bit, and "UCS" stands for Universal Character Set. UCS is an explicit name for the character specifications typically called Unicode. Thus, UTF-8 encoding is basically an 8-bit transmission format for Unicode. The ASCII specification is also an eight bit format, though characters employing the $8^{th}$ ("high-order") bit are often known as "extended ASCII" characters.

In some operating systems, such as Unix, it is thus easier than in others, such as Windows, to make non-ASCII character specification functions calls. This is because, for example, in Unix, the same function call can be made for a non-ASCII Unicode character specification as for an ASCII character specification, and the query string is automatically transformed to UTF-8 encoding. In Windows, on the other hand, the actual file specification must be encoded separately into a Unicode encoding, such as UCS-2 (Universal Character Set 2-byte), and a different function call must be made. Thus, in cross-platform development environments, developers must typically explicitly code their applications to deal with the problems associated with passing non-ASCII file specifications to an operating system's file system. In prior art cross-platform application development systems and methods, developers typically have to write programmatically wrapped code that will execute differently (different calls will be made) depending on whether the developer is building an application for, for example, a Windows environment, or for a Unix environment, or other operating system environment. The result of these prior art methods and systems is that developers end up duplicating their efforts by writing cluttered code with split functionality to ensure that file system function calls will execute properly for each operating system environment they expect to encounter. The resulting application code can be lengthy, duplicative, and thus, inefficient.

A developer's programmatic interface to an operating system's file space must thus be able to handle non-ASCII file specifications in a cross-platform development environment. The file path (absolute or relative), including the directory hierarchy and the leaf node file name itself, can be non-ASCII, and thus there must be a means in place for handling non-ASCII file specifications. Currently, the encoding of non-ASCII file specifications and the encoding capabilities of the underlying file system API (at the operating system level) must be handled programmatically by the developer. Each operating system maintains different encoding interfaces for file system interaction, forcing developers to make operating system appropriate function calls when interacting with that operating system's file space. This results in unwieldy, cluttered and unnecessarily duplicative and complicated code writing for developers.

SUMMARY OF THE INVENTION

Therefore, there is a need for a method and system for platform-independent file system interaction that can provide an application developer the capability to interface with an operating system's file system in a singular manner that is seamless and transparent to the developer regardless of the underlying operating system.

Further, a need exists for a method and system for platform-independent file system interaction that can automatically determine an operating system's file system API capabilities and provide a simple, singular programmatic interface for developers to access and manipulate file system specifications regardless of operating system encoding capabilities or of the nature of an operating system's file specification encoding.

In accordance with the present invention, a method and system for platform-independent file system interaction are provided that substantially eliminate or reduce the disadvantages associated with prior art methods and systems for cross-platform application development interactions with an operating system's file system.

More specifically, the present invention provides a method and system for platform-independent file system interaction that can abstract the system-level idiosyncrasies associated with multi-platform, multi-language, multi-encoding file system interactions. One embodiment of the method of this invention can comprise instantiating a string object via a development environment coded calling process and setting a file name and a file path, having an easily-identifiable format, for the string object with the calling process. The string object can determine the encoding of the file name and the file path and the calling process can forward the string object and an associated file operation to an operating system level file system interface handler. The operating system level file system interface handler can call an operating system naming function to format the string object. The string object naming function can be compiled along with an encoding marker indicating the target operating system for the desired file operation. The file name and the file path can be transcoded, based on the encoding marker value, to the encoding of the target operating system. The transcoded file name and file path can be returned to the development environment (e.g., to a developer's application) by the string object naming function. The operating system level file system interface handler can then execute the file operation.

A technical advantage of the method and system for platform-independent file system interaction of the present invention is that it can provide an application developer the capability to interface with an operating system's file system in a singular manner that is seamless and transparent to the developer regardless of the underlying operating system.

Another technical advantage of the method and system of this invention is that it can automatically determine an operating system's file system API capabilities and provide a simple, singular programmatic interface for developers to access and manipulate file system specifications regardless of operating system encoding capabilities or of the nature of the original file specification encoding.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION OF THE INVENTION

Figure 1:
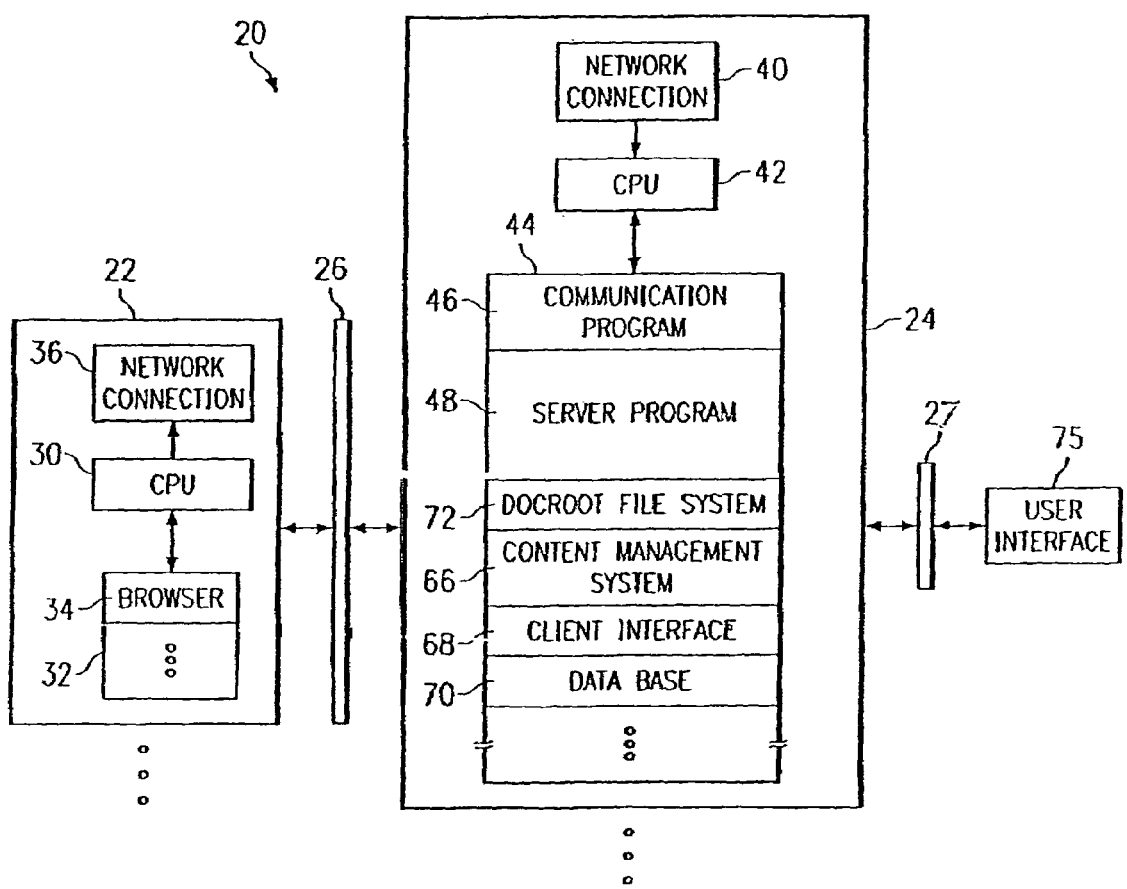
FIG. 1 is a simplified block diagram illustrating a client server computer network 20 that may be used to implement an embodiment of the method and system of the present invention.

Preferred embodiments of the present invention are illustrated in the FIGURES, like numerals being used to refer to like and corresponding parts of the various drawings.

Embodiments of the method and system of the present invention provide application developers with a means to automatically determine a file system's API capabilities and provide a simple, singular programmatic interface for developers to access and manipulate file specifications regardless of the operating system encoding capabilities or of the nature of the operating system's file specification encoding. Embodiments of the method and system of this invention can be implemented together with the inventions disclosed in related U.S. patent application Ser. No. 09/965,914 filed Sep. 28, 2001, entitled "Method and System for Cache Management of Dynamically-Generated Content" (the "Cache Management Application"), U.S. patent application Ser. No. 09/931,228 filed Aug. 16, 2001, entitled "Method and System for Determining a Network User's Locale" (the "Locale Detection Application"), U.S. patent application Ser. No. 10/027,383, filed Dec. 21, 2001, now U.S. Pat. No. 6,850,941, entitled "Method and System for Native-Byte Form Handling," and U.S. patent application Ser. No. 10/027,384, filed Dec. 21, 2001, now U.S. Pat. No. 7,194,506, entitled "Method and System for Cache Management of Locale-Sensitive Content." These applications are hereby incorporated by reference in their entirety.

Embodiments of the method and system of this invention can provide application developers the capability to do away with the multiple separate function calls that previously have had to be programmed into an application to ensure compatibility with the underlying computer system's operating system and file system capabilities. The embodiments of this invention can instead provide developers the capability to interface (via a singular interface) to a predefined "magic class" string specification, which can be the same regardless of the operating system platform for which a developer is writing an application. The embodiments of the present invention can comprise a string-encoding class that application developers can interface with in the same manner, regardless of the underlying operating system. The string-encoding class of the embodiments of this invention does not have to be precompiled separately and can receive incoming bit strings and automatically transcode them to the encoding of a developer's target operating system.

In a manner transparent to the developers, incoming bit strings are received as inputs by the magic class string which can then automatically determine the operating system that is being called. The magic class string can then encode (transform) the bit string with the appropriate operating system encoding, such as UCS-2 or UTF-8. Embodiments of the magic class string of the present invention can thus take a bit string in one encoding, transform it into a second encoding, and then automatically make the correct file system API call, whether the underlying operating system is a Unix system, a Windows system, or other operating system. In this way, embodiments of the method and system of this invention can provide developers with a platform, compiler, and string formatting independent interface for application development.

Embodiments of the magic class string encoding of the method and system of this invention can comprise a C++ software applet that can be compiled separately and that can be called in a transparent manner to instantiate an object of the strings encoding class for a developer to use. The magic class string encoding of the embodiments of this invention can be used with caching and server systems and methods such as those disclosed in the Cache Management Application and the Locale Detection Application. An application development environment on a computer system implementing an embodiment of the method and system of this invention can be configured such that when a bit string of one encoding is received, a magic class file string object is instantiated to transcode the bit string in a manner as described herein. A magic class object representing a bit string encoded using an embodiment of this invention can thus be passed to a development environment for processing or other manipulation. When the file associated with the bit string is to be written to disk, the magic class object representing the file can be forwarded to the operating system's file system to initiate the writing to disk.

The naming formatting of the magic class string and object can be an arbitrarily determined format, so long as the format is consistent and easily recognizable by the development environment. For example, the magic class file string can comprise the name "VGNI18N" as a predetermined portion of the file string format so that the file string name format can be easily recognized by the development system. Embodiments of the method and system of this invention can comprise a library through which all system input/output requests are processed by manipulating the magic class file string objects. Once a developer has written code for an application, he or she can include an indicator of the encoding of the operating systems for which the application is intended into the magic class file string. The operating system encoding can be indicated by a set of conditional logic; i.e., the capabilities of each operating system must be known to the developer in advance and programmed a priori by the developer. The magic class file string format of the embodiments of this invention can typically be used within a library, and the library system can be conditionally compiled (by operating system platform) to capture the requisite code snippets for inclusion in the library. Preprocessor statements can be used for this purpose.

Embodiments of the magic class file string of the method and system of this invention can also sit on top of a library such that all file system input/output requests are handled by manipulation of and instantiation of the file string class (e.g., a class object). Inside of each instantiation of a class object, a developer can include a small amount of code that sets an indicator at compile time. This is because, depending on the operating system, code written for that operating system will require, at compile time, the turning on of different switches to link to different libraries. Therefore, these small code pieces are programmed by a developer such that at compile time the code can automatically determine, based on conditional logic, on which operating system it is being compiled. This conditional logic (e.g., an "if" task) can be used to determine which API calls (operating system specific) should be made.

The encoding (magic class) objects of the embodiments of this invention can also perform dynamic string transcoding. In other words, if the magic class object is handed a string encoded in, for example, UTF-8, but the operating system of the underlying computer system is actually a Windows operating system, the class object can dynamically transcode from the UTF-8 encoding to a UCS-2 encoding and forward the UCS-2 encoded string to the Windows operating system. In this way, proper file system interactions can be performed regardless of the underlying operating system. The same operations can occur regardless of the operating system, such that, for example, if a UCS-2 string is provided and the application is running on a Unix system, the embodiments of this invention can transcode from UCS-2 encoding to UTF-8 encoding and hand the new UTF-8 string to the Unix operating system. It is contemplated that any operating system encodings can be transcoded using embodiments of the class object of the method and system of this invention so long as the operating system's encoding subsystem capabilities are known to the developer coding an application. For example, the Apple Macintosh and Linux operating systems can also be supported.

The embodiments of the method and system of this invention can be instantiated by a function call from within a developer's application code. Embodiments of the method and system of this invention can be implemented within any existing computer system having libraries that can be called by developers. The embodiments of the method and system of this invention can also comprise a library that can be called by applications. For example, an octet stream, representing a file specification, can be passed to the constructor of a magic class file string in accordance with the embodiments of this invention, along with an indication of the octet stream's encoding (e.g., using standard ISO and commercially accepted encoding names). The magic class object of the embodiments of this invention can then translate the octet from an original encoding into a Unicode representation of the same information.

FIG. 1 is a simplified block diagram illustrating a client server computer network 20 that may be used to implement an embodiment of the method and system of the present invention. Network 20 can include at least one client computer 22 and at least one server computer 24. Client computer 22 and server computer 24 can be connected by a transmission channel 26, which may be any wire or wireless transmission channel, including a fiber optic transmission channel. Client computer 22 can be a standard computer including a central processing unit ("CPU") 30 connected to a memory (primary and/or secondary) 32. Memory 32 can comprise any combination of RAM, ROM and/or a magnetic storage device such as a hard drive. As known to those in the art. RAM. ROM. magnetic storage devices, hard drives are examples of computer readable storage media. Memory 32 can store one or more computer programs, including a web browser 34, as known to those in the art. Web browser 34 can be used to communicate with remote server computers 24 and to visually present information received from server computers 24. Client computer 22 can establish network communications through a standard network connection device 36. Network connection device 36 can be any network connection device as known to those in the art.

Server computer 24 can include standard server computer components, including a network connection device 40, a CPU 42, and a memory (primary and/or secondary) 44. Network connection device 40, CPU 42 and memory 44 can be equivalent components to network connection device 36, CPU 30 and memory 32 of client computer 22. Memory 44 can store a set of computer programs (computer-executable software instructions) to implement the processing associated with this invention. As shown in FIG. 1, memory 44 can store a standard communication program 46 to realize standard network communication. Memory 44 can also store a standard server program 48. Server program 48 can be a standard HTTP software web server program, such as NCSA from the National Center for Supercomputing Applications, Champaign, Ill., or Apache™ from Apache HTTP Server Program, Lincoln, Nebr.

Memory 44 can also store a content management system (CMS) 66 and a database 70, that together can be used to create, test, modify, manage and store content that can be made available to server program 48. Content management system 66 can also be used to manage metadata associated with cached content that can be stored and accessed through docroot file system 72. Client interface program 68 is associated with and interfaces with CMS 66. Client interface program 68 can be the interface program to CMS 66 for developing templates for content. Client interface program 68 can also be used for modifying and deleting these content templates. Database 70 can be stored within memory 44 of server 24 or at another server location. Database 70 can be a standard relational database. Database 70 can be used to store libraries in which the embodiments of this invention can be implemented.

Client interface program 68 can be a Java-based interface and can be stored on memory 44 of server 24 or at another server location. Client interface program 68 can be called via user interface 75, which is communicatively connected to server 24 (or to any other server on which client interface program 68 is stored) by second transmission channel 27. User interface 75 can be a graphical user interface accessed by a keyboard and/or mouse and viewed on a computer monitor. User interface 75 can also be any other user-to-computer interface as known to those in the art. User interface 75 can be situated locally or remotely to server 24. User interface 75 can call client interface program 68 (i.e., access the server storing interface program 68) over transmission channel 27. Transmission channel 27 can be a direct connection or a network connection such as an Internet connection. User interface 75 can be used by application developers to implement code and can comprise the physical interface to the simple, singular programmatic interface of the embodiments of this invention for developers to access and manipulate file specifications.

Figure 2:
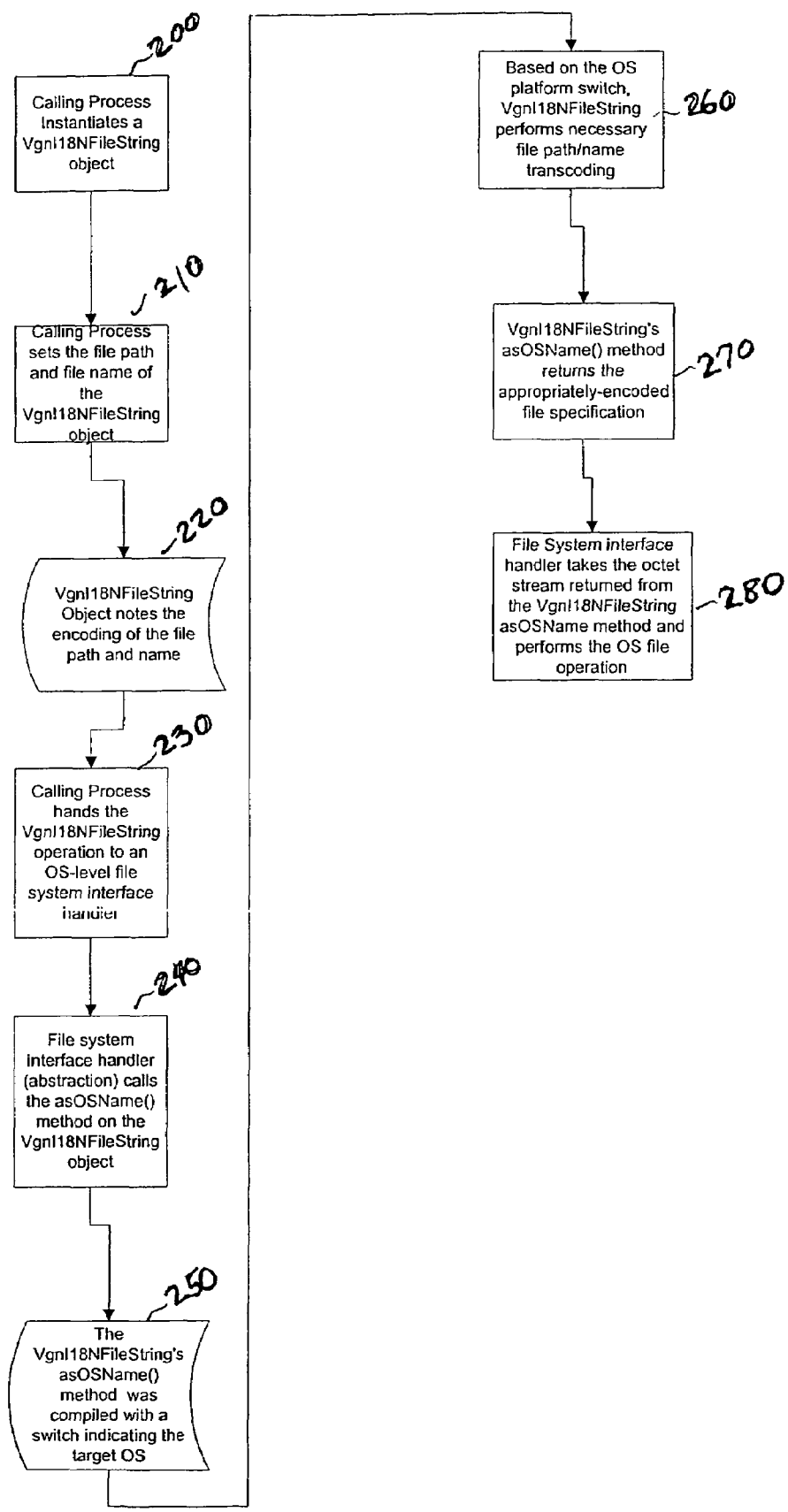
FIG. 2 is a flowchart diagram illustrating the operation of an embodiment of the magic class string object of the method and system of this invention.

FIG. 2 is a flowchart diagram illustrating the operation of an embodiment of the magic class string object of the method and system of this invention. At step 200, a developer's coded calling process within an application instantiates a string object (e.g., a magic class string object). Once a string object has been instantiated at step 200, at step 210 the calling process sets a file path and file name for the string object. The file path and string name format can be any arbitrarily selected format, so long as the format can be easily identified and is consistent throughout an application. At step 220, the instantiated string object can determine the encoding of the file path and name that has been passed to it and with which it is now associated. This encoding can be, for example, a Windows-based encoding, a Unix-based encoding, or the encoding of any other such operating system as known to those in the art.

Once a string object has determined the encoding of the file path and name, at step 230 the calling process can hand the string object and an associated operation to an operating system level file system interface handler. This operating system level file system interface handler can interface with the magic class string object of the embodiments of this invention as a back-end system, such that, to a developer, the encoding and transcoding of a string for file operations are transparent. At step 240, the file system interface handler can call an operating system naming function (e.g., asOSName) to operate on (e.g., name or format) the now encoded magic class string object. At step 250, the magic class string object asOSName function is compiled along with a switch marker indicating the target operating system for the file interaction. At step 260, based on the operating system platform switch, the magic class string object of the embodiments of this invention can perform the necessary file path/name transcoding to the target operating system's encoding, for example, to UCS-2 or UTF-8. At step 270, the string object's asOSName function returns the appropriately encoded file specification to the developer's application and then, at step 280, the operating system file system interface handler can take the octet stream returned from the string object asOSName function and perform the requested operating system file operation. In this way, developers can develop applications that can instantiate magic class string objects to dynamically transcode file operations from one encoding used by the developer to a second encoding required by the operating system for which a file operation is targeted.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A method for platform-independent file system interaction, comprising:

in a development environment computer having an operating system, a file system and a programmatic interface for applications to access file specifications:

receiving a bit string into a string-encoding class on said development environment computer running an application development environment;

instantiating, via a development environment coded calling process within an application, a string object of said string-encoding class to automatically transcode said bit string from a first encoding to a second encoding;

setting a file name and file path for said string object, wherein said calling process performs the setting;

associating at said development environment computer said string object with said first encoding of said file name and said file path that has been passed to said string object;

passing said string object and an operating system (OS) file operation associated with said string object to an operating system level file system interface handler, wherein said OS level file system interface handler interfaces with said string object at back-end in a manner transparent to a user of said development environment computer and wherein said calling process performs the passing;

calling an OS naming function to operate on said string object, wherein said OS level file system interface handler performs the calling;

compiling said OS naming function with an encoding marker indicating a target OS for said OS file operation, wherein a target computer supports said target OS;

based on said encoding marker, transcoding said file name and file path from said first encoding to said second encoding of said target OS supported by said target computer, wherein the string object performs the transcoding;

returning said transcoded file name and file path to said application, wherein said OS naming function performs the returning; and performing said OS file operation associated with said bit string utilizing said transcoded file name and file path.

2. The method of claim 1, wherein said OS level file system interface handler calling said OS naming function to name or format said string object.

3. The method of claim 2, wherein said encoding marker indicates an operating system platform switch.

4. The method of claim 1, further comprising receiving the bit string at the application development environment computer from a second computer.

5. The method of claim 4, further comprising initiating the calling process at the second computer.

6. The method of claim 4, further comprising receiving the file name and path name from the second computer.

7. The method of claim 4, wherein the second computer provides a physical user interface.

8. A computer system, comprising:

a processor; and a computer readable storage medium accessible by the processor and storing a set of computer instructions executable by the processor to:

receive a bit string into a string-encoding class on said development environment computer running an altercation development environment;

instantiate, via a development environment coded calling process within an application, a string object of the string-encoding class to automatically transcode the bit string from a first encoding to a second encoding;

set a file name and file path for the string object, wherein said calling process performs the setting;

associate said string object with said first encoding of the file name and the file path that has been passed to said string object;

pass the string object and an operating system (OS) file operation associated with said string object to an operating system level file system interface handler, wherein said OS level file system interface handler interfaces with said string object at back-end in a manner transparent to a user of said development environment computer and wherein said calling process performs the passing;

call an OS naming function to operate on said string object, wherein said OS level file system interface handler performs the calling;

compile said OS naming function with an encoding marker indicating a target OS for said OS file operation, wherein a target computer supports said target OS;

based on said encoding marker, transcode said file name and file path from said first encoding to said second encoding of said target OS supported by said target computer, wherein the string object performs the transcoding;

return said transcoded file name and file path to said application via said OS naming function; and perform said OS file operation associated with said bit string utilizing said transcoded file name and file path.

9. The computer system of claim 8, further comprising computer instructions executable to:

call said OS naming function to name or format the string object.

10. The computer system of claim 8, wherein the encoding marker indicates an operating system platform switch.

11. The computer system of claim 8, further comprising computer instructions executable to perform the operating system file operation at the operating system level file system interface handler.

12. The system of claim 8, wherein a first computer comprises the processor and the computer readable storage medium and wherein the system further comprises a second computer coupled to the first computer via a transmission channel.

13. The system of claim 12, wherein the second computer provides a user interface for the first computer.

14. The system of claim 12, wherein the second computer runs an application that initiates the coded calling process.

15. The system of claim 14, wherein the second computer provides the file name and path name to the first computer.

16. A computer readable storage medium storing computer instructions executable by a processor to:

provide an application development environment on a computer having an operating system (OS) and a file system;

receive a bit string into a string-encoding class on said computer;

instantiate, via a development environment coded calling process within an application, a string object of the string-encoding class to automatically transcode the bit string from a first encoding to a second encoding;

set a file name and file path for the string object, wherein said calling process performs the setting;

associate said string object with said first encoding of the file name and the file path that has been passed to said string object;

pass the string object and an operating system file operation associated with said string object to an operating system level file system interface handler, wherein said OS level file system interface handler interfaces with said string object at back-end in a manner transparent to a user of said development environment computer and wherein said calling process performs the passing;

call an OS naming function on said computer to operate on said string object, wherein said OS level file system interface handler performs the calling;

compile said OS naming function with an encoding marker indicating a target OS for said OS file operation, wherein a target computer supports said target OS;

based on said encoding marker, transcode said file name and file path from said first encoding to said second encoding of said target OS supported by said target computer, wherein the string object performs the transcoding;

return said transcoded file name and file path to said application via said OS naming function; and perform said OS file operation associated with said bit string utilizing said transcoded file name and file path.

17. The computer readable storage medium of claim 16, further comprising computer instructions executable to:

call said OS naming function to name or format the string object.

18. The computer readable storage medium of claim 16, wherein the encoding marker indicates an operating system platform switch.

19. The computer readable storage medium of claim 16, further comprising computer instructions executable to perform the operating system file operation at the operating system level file system interface handler.

* * * * *